(12) United States Patent
Dyas et al.

(10) Patent No.: US 6,704,046 B2
(45) Date of Patent: Mar. 9, 2004

(54) DIGITAL PIXEL IMAGE SENSOR WITH INDEPENDENT COLOR CHANNEL REFERENCE SIGNALS

(75) Inventors: Robert Dyas, Naperville, IL (US); Francisco Castro, Saint Charles, IL (US); Austin Harton, Oak Park, IL (US); Barry Herold, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/124,381

(22) Filed: Apr. 17, 2002

(65) Prior Publication Data

US 2003/0197799 A1 Oct. 23, 2003

(51) Int. Cl.[7] .......................... H04N 9/73; H04N 5/335
(52) U.S. Cl. ................... 348/223.1; 348/297; 348/308; 250/208.1
(58) Field of Search ........................ 348/223.1–225.1, 348/228.1, 229.1, 308, 271, 273, 276, 279, 297; 250/208.1, 208.2, 226; 257/292, 291, 461; 358/504, 520

(56) References Cited

U.S. PATENT DOCUMENTS

| 4,011,016 | A | * | 3/1977 | Layne et al. ................. 257/461 |
|---|---|---|---|---|
| 4,309,604 | A | * | 1/1982 | Yoshikawa et al. .......... 250/226 |
| 4,996,417 | A | * | 2/1991 | Shinomiya ............... 250/208.2 |
| 5,502,299 | A | * | 3/1996 | Standley .................. 250/208.2 |
| 5,682,562 | A | * | 10/1997 | Mizukoshi et al. ......... 396/159 |
| 5,900,623 | A | * | 5/1999 | Tsang et al. ............. 250/208.1 |
| 5,917,556 | A | * | 6/1999 | Katayama ................ 348/223.1 |
| 5,965,875 | A | * | 10/1999 | Merrill .................... 250/208.1 |
| 6,133,954 | A | * | 10/2000 | Jie et al. ..................... 348/308 |
| 6,150,683 | A | * | 11/2000 | Merrill et al. .............. 257/292 |
| 6,201,617 | B1 | * | 3/2001 | Kusaka ...................... 348/297 |
| 6,271,940 | B1 | * | 8/2001 | Deschuytere et al. ....... 358/504 |
| 6,377,303 | B2 | * | 4/2002 | O'Connor .................. 348/308 |
| 6,504,196 | B1 | * | 1/2003 | Rhodes ....................... 257/292 |
| 6,518,085 | B1 | * | 2/2003 | Wang et al. .................. 438/70 |
| 6,518,558 | B1 | * | 2/2003 | Bohm et al. ............. 250/208.1 |
| 2003/0015647 | A1 | * | 1/2003 | Guo et al. ............... 250/208.1 |

* cited by examiner

*Primary Examiner*—Aung Moe
(74) *Attorney, Agent, or Firm*—James A. Lamb (57) ABSTRACT

A pixel image sensor having an array of pixel elements arranged in a color mosaic pattern, each pixel element being responsive to light of a particular color. Each pixel element is supplied with a reference voltage signal corresponding to the color of light to which the pixel element is responsive. The reference voltage signal determined the sensitivity of the pixel element. The white balance of the image sensor is adjusted by varying independently the reference voltage signals for each color. The color mosaic pattern of the array may include a pixel element responsive to white light. The output from the white pixel sensors may be used to adjust the color constancy of the image sensor. The image array reduces the need for post-capture processing of the image for white balancing, by incorporating the white balance operation into the capture process.

23 Claims, 6 Drawing Sheets

DIGITAL PIXEL IMAGE SENSOR WITH INDEPENDENT COLOR CHANNEL REFERENCE SIGNALS

TECHNICAL FIELD

This invention relates to techniques and apparatus for color image sensing and in particular to improve color balancing.

BACKGROUND OF THE INVENTION

Perceived colors depend almost exclusively on surface reflectance, yet the light that reaches the eye is a function of both surface reflectance and scene illumination. White balance actions are used in digital imaging systems to mimic a person's ability to remove the effects of scene illumination from the perception of color.

An example of constant color perception in humans is that a white page looks white whether viewed under a yellow Tungsten light or under the blue sky. The human vision system somehow compensates for variations in illumination in order to achieve this result, although the processes through which this is attained are not well understood. A solid-state imaging system should implement a mechanism with a similar effect, otherwise the white page will look light blue under the latter condition and slightly yellow under the former. The goal of the white balance operation is to provide the imaging system with a compensation mechanism that allows it to reproduce constant white colors under different illumination hues.

In many imaging systems, much of the balancing process is performed on the analog sensor signal before it is recorded or transmitted. In particular, the white balance process is commonly described by the following two operations:

1. COLOR CHANNEL BALANCING. This operation compensates for the unequal spectral sensitivities of the different color channels in a digital image sensor. The color channels in a typical Bayer pattern color filter mosaic are: Red, Blue, Green-Red, and Green-Blue. The latter two are used to differentiate between green pixels adjacent to red pixels and green pixels adjacent to blue pixels.
2. COLOR CONSTANCY (also known as illuminant compensation). This operation attempts to mimic the human visual system's phenomenon of keeping white objects constant. The illumination level in the scene is estimated and then the appropriate color transform is constructed. The estimation is generally carried out in software and fed back to the sensor.

White balance operations are usually performed in the analog processing chain of the sensor. They are difficult to implement and may contribute additional noise to the sensor data prior to digital conversion. Because the physical conditions that warrant white balance actions cannot be removed, the only recourse for reducing the hardware/software overhead that they entail, as well as minimizing their noise contributions, is to find alternative approaches.

Current image sensors are based on active pixel architectures and provide white balance actions as part of their post-capture analog processing chain. Color balancing operations require four input planes, one for each color channel, and this demands certain management overhead. The estimation of illuminant levels for color constancy operations is usually carried out in software and the linear transformation operation to produce the illuminant compensation is carried out in analog form which limits the dynamic range of the final compensated results.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 1:
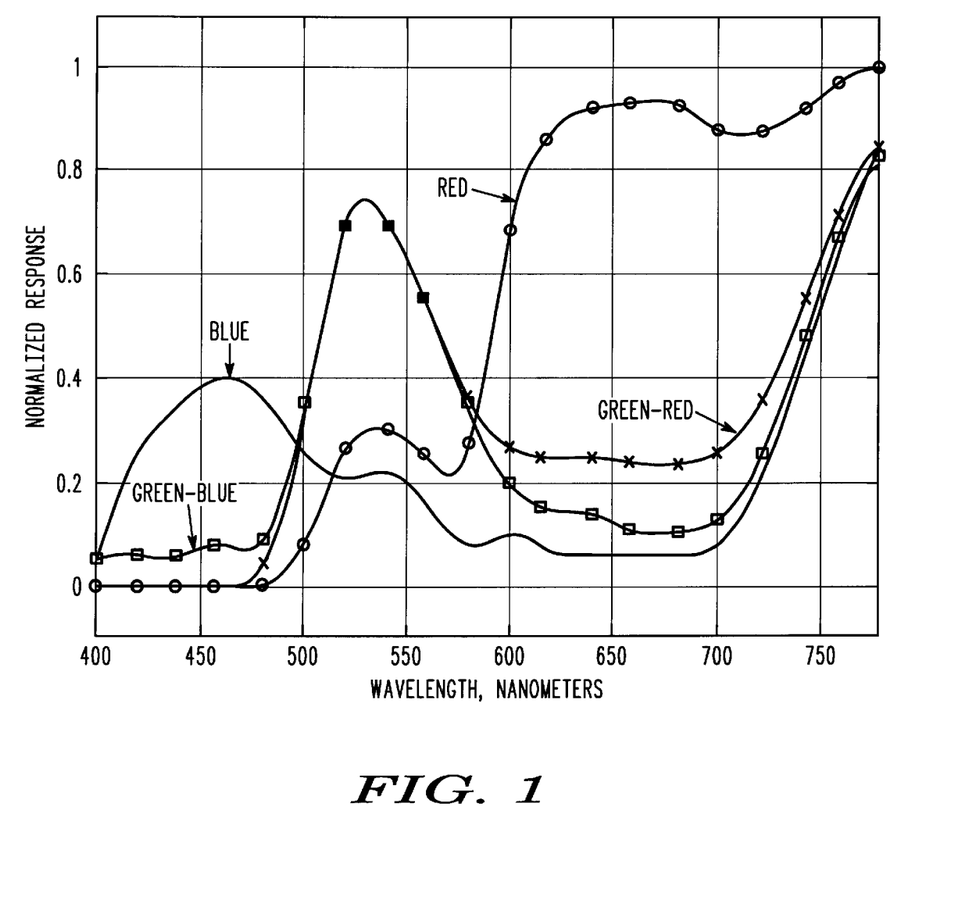
FIG. 1 is a graph of the relative spectral responses of color channels in an exemplary image sensor.

A color image sensor is usually composed of an array of pixel sensors arranged behind a color filter array or mosaic. It may also be constructed using a time-switched color filter or a beam splitter (prism). Often a Bayer pattern is used for the mosaic. Color channel balancing attempts to compensate for the unequal sensitivities of the different color channels in an imaging sensor using a Bayer pattern for its color filter mosaic. FIG. 1 shows the corresponding sensitivities for the Red, Blue, Green-red, and Green-Blue color channels in an exemplary image sensor. The different sensitivities must be compensated for otherwise an acquired image will not have natural color when viewed on a standard color display.

The dynamic range of a charge accumulating pixel sensor may be adjusted by varying the reference voltage applied to the pixel. By using the independent triggering mechanism inside pixel sensors with charge accumulation pixels, it is possible to set independent voltage reference signals to each color channel in the Bayer pattern, or any other color filter mosaic, to produce the equivalent effect of color balancing during the capture stage. This approach takes advantage of the parallelism inherent in this sensor to eliminate the color balancing operation—and its noise—from the post-capture analog processing chain. Furthermore, with the ability to control each color channel independently, a green filter location in the Bayer pattern can be replaced with a white— translucent—color filter. This step allows for direct measurement of the illuminant level and provides the ability to make the determination of the proper color transform locally. This eliminates the need for complex feedback mechanisms. Finally, because the voltage reference signals are generated using digital-to-analog converters (DAC) and can therefore have non-monotonic behavior, it is possible to optimize the dynamic range for each color channel independently.

The spectral response of red, green, and blue pixels in a Bayer pattern are different because the transmission properties of filters used to create the pattern are different for each color. In other words, the same light incident on different color pixels does not result in the same output value. This effect is compensated for by applying different reference voltage signals to each color channel in the sensor. When using the Bayer pattern, each pixel only captures one color of the RGB triplet needed to fully represent an image. The other two colors needed at each pixel are generated through interpolation algorithms. In the case of an RGBW pattern, the white (W) pixel needs all three colors generated through interpolation.

To maintain color constancy, an algorithmic method is used to identify components of a particular color inside an image and so to determine the reference voltage levels that need to be supplied to the sensor in order to keep these components constant even as illumination conditions are changed. These components could be individual pixels or specific regions, the choice is based on the level of complexity of the algorithm and the computational requirements of the application. In most digital imaging systems a single color is generally chosen for this purpose: white. Color constancy, or white color constancy for that matter, is achieved by adjusting the reference voltage signal for each of the sensor's color channels in order to maintain the RGB values of an image's white components the same even as the viewing illuminant is varied. White is generally designated in digital imaging systems as having all three color channel values (RGB) equal to the maximum digital value of the system. In the case of an 8 bit system, R=G=B=255 for a truly white pixel.

An example of a plausible pixel-based white balance procedure is as follows:

STEP 1: The pixel in row 0, column 0 of the array, a red pixel, records an integration time that is converted via a lookup table to the digital number 216 out of a maximum of 255 for an 8-bit system. Pixel in row 1, column 1, a blue pixel, records an integration time that is converted to the digital value 240. Color channel gains are originally set to unity for all colors.

STEP 2: After color interpolation is performed, the color values for pixel (0,0) are: Red=216, Green=209, Blue=235. The values for pixel (1,1) are Red=222, Green=251, Blue=240. The white balance algorithm determines that pixel (1,1) is the closest to true white (Red=255, Green=255, Blue=255) of all the pixels and uses it as reference. It calculates that the sensor blue color channel gain must change to 1.06, the red channel to 1.14, and the green channel to 0.98.

STEP 3: Under the same illumination pixel (0,0) is now Red=246, Green=203, Blue=235, pixel (1,1) is now Red=253, Green=248, Blue=255. Pixel (1,1) has been made "whiter" by this procedure. As the illumination changes the gains are varied to make the "whitest" pixel closer to the true white.

If the illuminant is known in advance, white balance can be achieved by capturing a reference image of a white surface and adjusting the relative levels of the reference voltages for the color channels so that the reference image is white.

Another white balance approach determines the brightest pixels and calculates the average value for each color channel for the bright pixels or for pixel neighboring the bright pixels. The reference voltages are set so that the average values for the each color channel are equal. When white pixels are included in the array, the white pixel values can be used to determine which areas of the image are the brightest.

Figure 2:
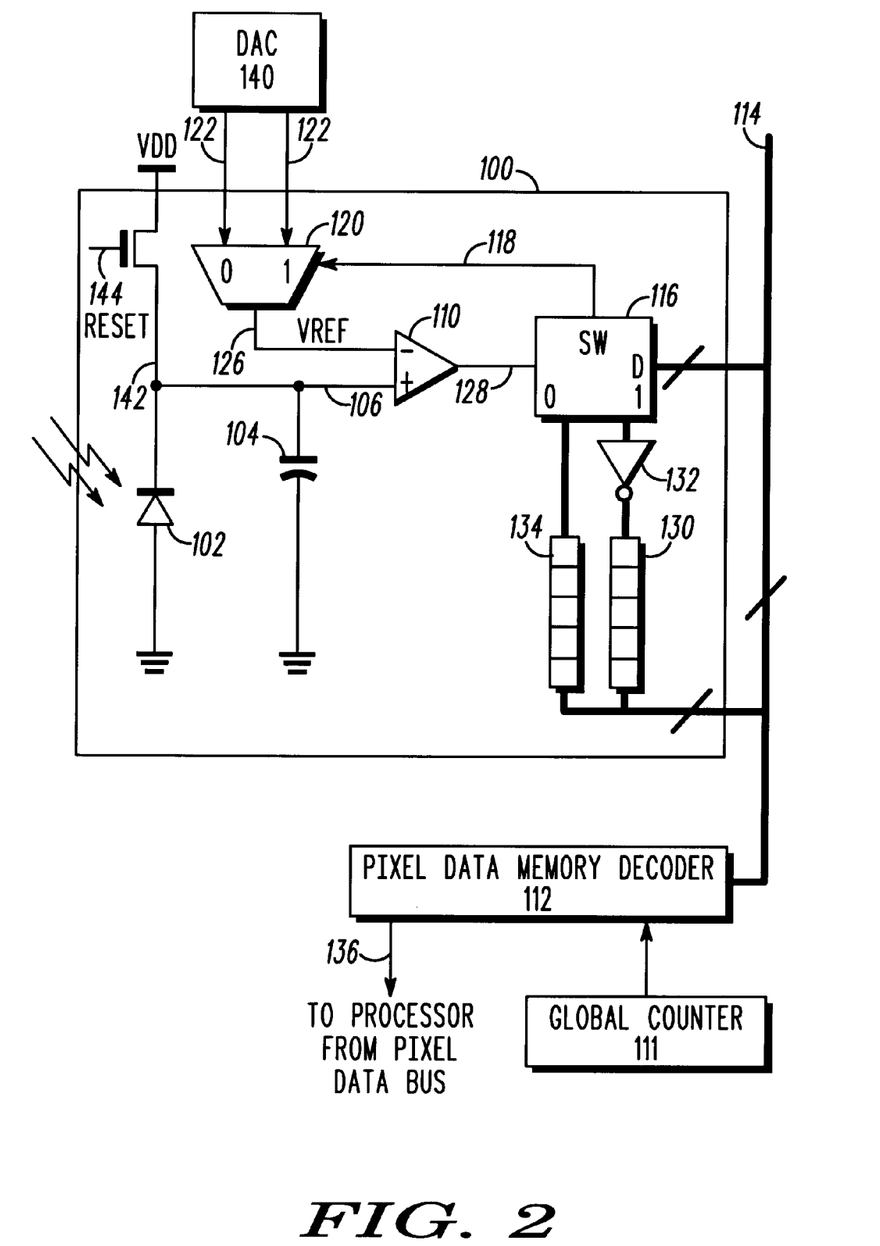
FIG. 2 is a diagrammatic representation of an exemplary Digital Pixel element.

An exemplary time-integrating pixel architecture 100 is shown in FIG. 2. The pixel architecture 100 comprises a photo-detector 102 and a capacitive element 104 such as a floating diffusion capacitor. In operation, the photo-current charges the floating diffusion capacitor and produces a photo-voltage 106. The charge is allowed to move directly from the photo-detector to the diffusion capacitor without the use of a transfer gate. The photo-voltage 106, sensed by the floating diffusion capacitor, and a reference voltage 126 are supplied as inputs to comparator 110. The voltage across the capacitor is proportional to the integration time. After an integration time $t_1$, the photo-voltage 106 sensed by the floating diffusion capacitor and the reference voltage 126 are equal. In the pixel architecture shown in FIG. 2, a global counter 111 is reset at time t=0. The global counter value is supplied to the pixel architecture via pixel data memory decoder 112 and data bus 114. The switch 116 provides a logic control signal 118 to selector 120, which causes one of the two reference voltages VREFL 122 and VREFH 124 to be passed to the output 126 of the selector 120. The reference voltages, VREFL and VREFH, may be provided by a digital-to-analog converter (DAC) 140. Initially, the lower of the lower voltage VREFL is selected. When the photo-voltage 106 exceeds the reference voltage 126 for a particular pixel, the output 128 from the comparator 110 changes value. At that time the global counter value is latched and stored in the first pixel data buffer 130. Optionally, the counter value may be negated by passing it through inverter 132. Latching the counter values avoids the need to interrogate the comparator output. In the preferred embodiment, the counter value is stored in the pixel data buffer 130. One latch is used for each bit in the buffer. In the figure the latching mechanism is assumed to be an integral part of the pixel data buffer in the preferred embodiment. After the counter value has been stored in the first pixel data buffer 130, the logic control signal 118 is switched so that the higher of the two voltages 122 and 124 is passed to the output 126 of the selector 120. This provides a higher reference voltage level. When the higher reference voltage level is exceeded, the value of the global counter is latched into the second pixel data buffer 134. The first and second pixel data buffers then contain the global counter values corresponding to the times taken for the sense capacitor to reach the two reference voltages. The illumination intensity $P_i$ can therefore be calculated from knowledge of the two reference voltages and the two integration times. The calculation may be performed by an external processor or by a processor integrated with the pixel array. The processor may also perform calculations to determine the reference voltage signals required for white balancing.

In FIG. 2, only a single pixel element is shown for ease of illustration. In practice, an array of pixel elements will be integrated in a single device, such as a CMOS device. Pixel data memory decoder 112 is coupled to a data bus 114 and is used to decode the data from individual pixel sensors and send it via data bus 136 to a processor (not shown). Logic elements in switch 116 are used to route data from the pixel data buffers 130 and 134 to the bus 114.

A D.C. power supply Vdd 142 is supplied to all of the electronic components in the pixel sensor. This may be 3.3V, for example. When a reset signal is supplied to the gate of transistor 144, the transistor turns on and the photo-voltage 106 reaches a voltage close to the supply voltage Vdd. This resets the pixel sensor. As light falls on the photo-detector, the voltages drops relative to Vdd. The comparator detects when the voltage falls below the level —VREF.

In the time integration pixel described above, the pixel comparator triggers a digital capture event when the reference voltage is reached. White balance actions can vary this reference voltage making the time at which the event takes place vary in order to achieve color constancy even as illumination intensities are changing.

In an alternative pixel-architecture, voltage measurements and digital conversion are performed by the pixel circuitry. The conversion generally makes use of a comparator to determine the digital representation of the analog signal. The reference voltage to the comparator can be modified according to a decision made by the white balance algorithms. For example, when a ramp signal is used as the reference voltage signal, the slope of the ramp may be varied.

In either architecture, the use of independent color channel reference voltages allows more control over the feedback operation than a single reference signal.

In a color image sensor, a color filter array may be placed in front of the pixel array, so that different sensors are responsive to light of different wavelengths, as illustrated in FIG. 1. The sensitivities of the pixel sensors are adjusted by varying the reference voltages VREFH and VREFL. In accordance with the present invention, different reference voltages are supplied to different color pixels, allowing the color balance of the array sensor to be adjusted.

Figure 3:
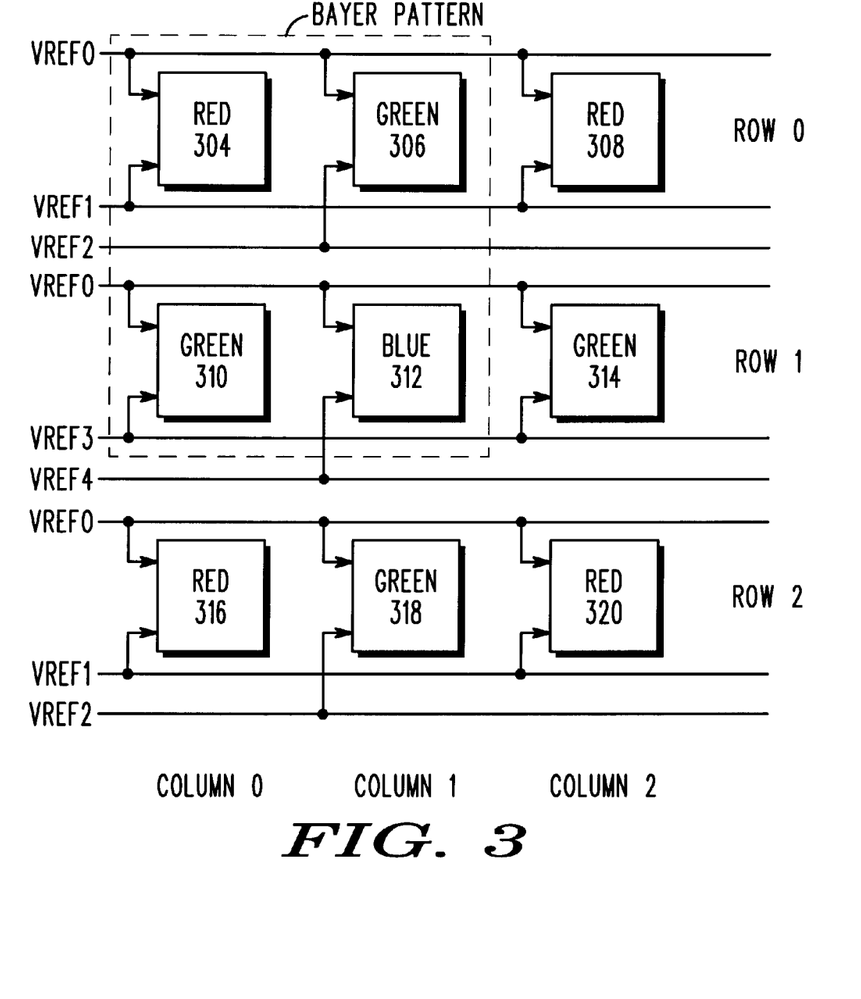
FIG. 3 is a diagrammatic representation of an RGGB (Bayer) mosaic pattern for a Pixel Array in accordance with the invention.

A section of an imaging array of the present invention is shown in FIG. 3. The pixel sensors 304, 308, 316 and 320 are configured to receive red light, the pixel sensors 306, 310, 314 and 318 are configured to receive green light and the pixel sensor 312 is configured to receive blue light. The color and amount of light falling on each pixel sensor is determined by the transmission properties of the color filter array (CFA). The pixel sensors 304, 306, 310 and 312 form a Bayer Pattern. A Bayer pattern contains twice as many green pixel sensors as red or blue pixel sensors since the eye is more sensitive to green light. However, other color patterns may be used. The imaging array utilizes a total of five voltage-reference signals to control the color channels: one, VREF0, for the high reference, and four, VREF1 through VREF4, for the low references. The four low references are routed to the individual pixels in a Bayer pattern to allow for different settings in each color channel, while VREF0 is common to all pixels. In one embodiment, the reference signals are generated by independent digital-to-analog converters (DAC) so that it is possible to provide individually controlled, non-monotonic reference voltages to each color channel during the image capture process. In a color system with a RGGB Bayer pattern, VREF1 corresponds to the red pixel, VREF2 and VREF3 correspond to green pixels, and VREF4 corresponds to the blue pixel, as depicted in FIG. 3. The array is arranged so that the (0,0) location is in the upper left corner of the array. The dashed box indicates the color filter mosaic that represents the Bayer pattern.

Figure 4:
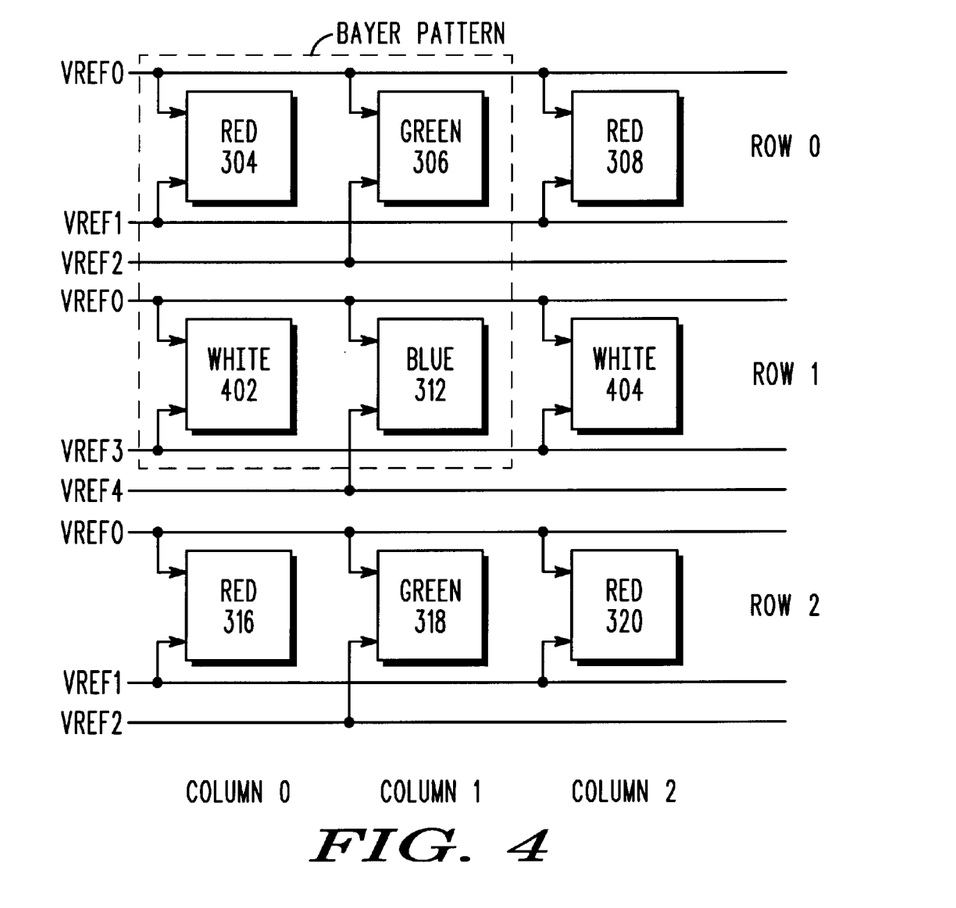
FIG. 4 is a diagrammatic representation of an RGWB mosaic pattern for a Pixel Array in accordance with the invention.

In a further embodiment of the invention, a white pixel is substituted for a green pixel in the color mosaic, creating an RGWB Bayer pattern as shown in FIG. 4. This is possible provided dynamic range of the color channel is sufficient. In this arrangement, white pixel sensors 420 and 404 are used instead of green pixel sensors. This color filter pattern allows for direct measurement of the illuminant level for color constancy algorithms. This is possible because the white color channel can be controlled independently to avoid saturation, something that is much harder to do in post-capture manipulations. In STEP 2 of the white balance process described above, there is no need to determine which pixel is closest to white, since white pixels are available. This further simplifies the white balance operation.

Figure 5:
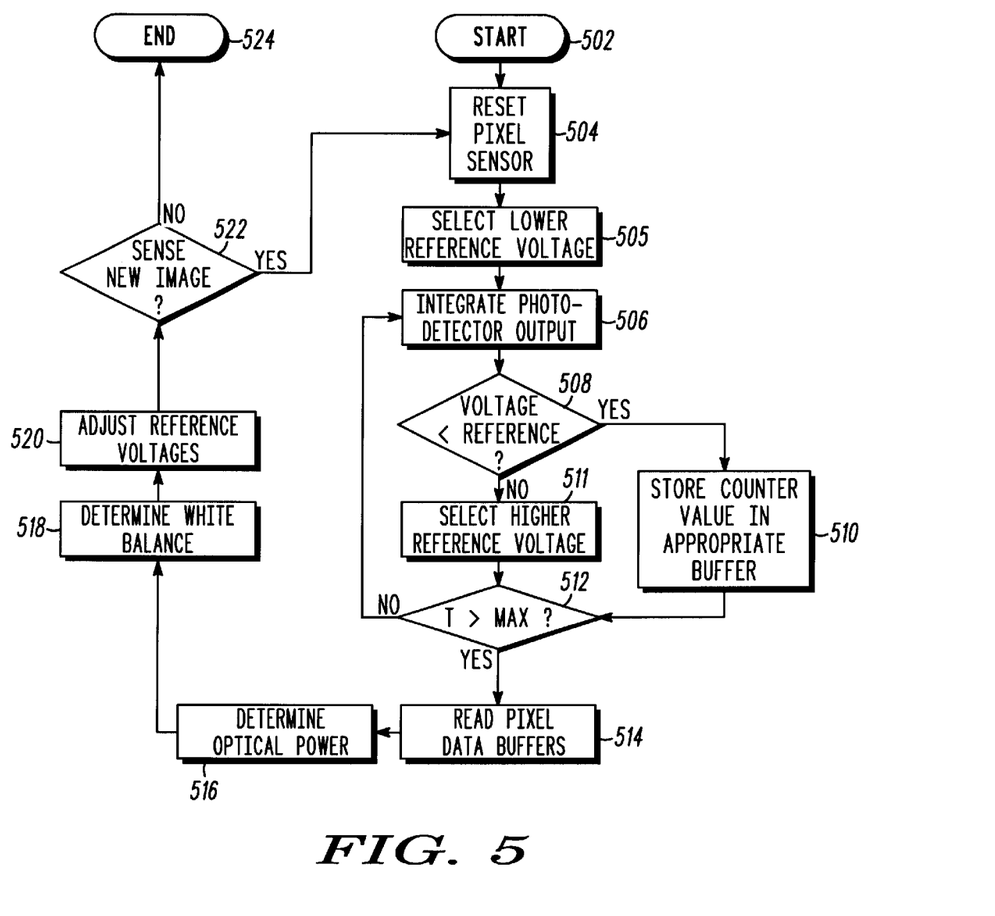
FIG. 5 is a flow chart of one embodiment of the method of the invention.

A flow chart depicting one embodiment of the method of the present invention is shown in FIG. 5. The method is described with reference to a single pixel sensor, but may be applied to each pixel sensor in the array of pixel sensors. Operation begins at start block 502. The pixel photo-detector is reset at block 504, by discharging the charge accumulation capacitor for example. The lower of the two reference voltages is selected at block 505. The output from the photo-detector is integrated at block 506. If a floating discharge capacitor is used, the photo-detector output current is integrated by the capacitor to produce a photo-voltage. At decision block 508 the photo-voltage is compared with the reference voltage. If the photo-voltage is less than the reference voltage as depicted by the positive branch from decision block 508, the current value of a global counter (which is supplied to the pixel sensor) is stored into a first pixel data buffer at block 510. Flow than continues to decision block 512. If the photo-voltage exceeds the reference voltage, as depicted by the negative branch from decision block 508, the higher reference voltage is selected at block 511 and the integration process continues. Decision block 508 may be implemented as a comparator. Thus the last value stored in the first pixel data buffer will be the counter value at which the photo-voltage reaches the lower reference voltage. The value is thus latched into the pixel data buffer. While the photo-voltage is less than the higher reference voltage as depicted by the positive branch from decision block 508, the current value of the global counter is stored into a second pixel data buffer at block 510. When the higher reference voltage is exceeded, the current global counter value is no longer written into the second pixel data buffer, so the value when the threshold was crossed is latched into the buffer. At decision block 512, a check is made to determine if the maximum time for integration has been exceeded. If the maximum time has been exceeded, as depicted by the positive branch from decision block 512, the pixel data buffer is read. If the maximum time has not been exceeded, as depicted by the negative branch from decision block 512, the system waits until the time has been exceeded. At block 514, the pixel data buffers are read, whether or not the reference voltages have been reached. At block 516, the optical power is determined from the counter values read from the pixel data buffers. This allows the relative levels of the different color channels to be determined. In addition, if a RGWB mosaic is used, the illumination level may be determined directly from the power levels of the white pixel sensors. From these levels, the appropriate white balance is determined at block 518. At block 520 the reference voltage levels VREF1 through VREF4 are adjusted to achieve the desired white balance. At decision block 522, a check is made to determine if a new image is to be sensed. If a new image is to be sensed, as depicted by the positive branch from decision block 522, flow returns to block 504 and the pixel sensors are reset. If no more images are to be sensed, as depicted by the negative branch from decision block 522, the process terminates at block 524.

Figure 6:
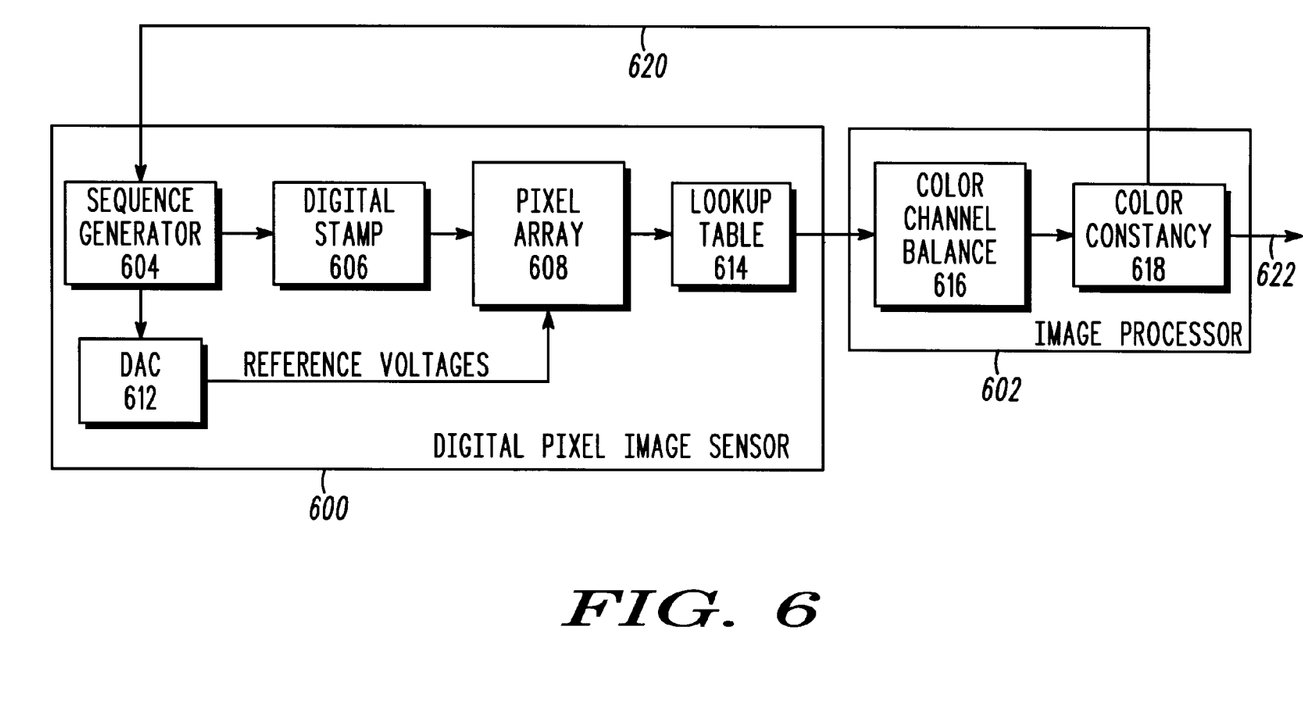
FIG. 6 is a diagrammatic representation of a Digital Pixel Image Sensor according to one embodiment of the invention.

One embodiment of a digital pixel image sensor of the present invention is shown in FIG. 6. The digital pixel image sensor 600 is used in conjunction with an image processor 602 that may be integrated with the digital pixel image sensor. In this embodiment, the digital pixel image sensor 600 comprises a sequence generator 604 that controls a global counter or digital time stamp 606. The digital time stamp supplies a timer signal (such as a global counter value) to each element in the pixel array 608 via a data bus. The pixel array 608 is composed of a number of pixel elements arranged in a color mosaic pattern and has at least three color channels (red, green and blue). Additional color channels (such as a white channel, or green-blue and green-red channels) may be provided. The sensitivity of each color channel of the image sensor is controlled by reference voltages 610 supplied by digital-to-analog converter (DAC) 612. The DAC, in turn, is controlled by the sequence generator 604. The output from each element the pixel array is one or more digital values. The digital values are converted in lookup table 614 to a digital power value representing the power of the light incident upon the pixel. The digital values, one from each pixel element, are passed to the image processor 602 via a serial or parallel connection. The image processor may include a color balance module 616 and a color constancy module 618. The processor is configured to calculate the reference voltages that are required to produce the desired color balance. The image processor controls the sequence generator 604 over feedback link 620. The sensitivities of the color channels may be predetermined, so that color balance module 616 is not required. The color constancy module 618 may utilize a white color channel to determine the reference voltages that will result in the desired color channel sensitivities. The array output 622 is obtained from the image sensor and need not be subject to post-capture processing for white-balance, since the white balance has been performed at the capture stage. In video capture, the reference voltage adjustment performed by the image processor need not operate at the capture frame rate, since the illumination does not often change significantly between consecutive frames. This reduces the amount of processing required.

A significant competitive advantage is gained, as image sensor arrays become larger and high frame rates are required, by reducing post-capture image processing time and any noise sources associated with it. This effect is achieved by moving the color balancing operations from the post-capture sequence to the image capture stage by taking advantage of the independent pixel referencing in digital pixel sensors and transform the operation from serial to parallel in nature. An advantage in image quality is obtained from the ability to use white pixels to locally calculate color constancy transforms and eliminate the need from complex feedback operations running on software. Finally, because these operations occur during image capture, the stored digital values have inherent information on the dynamic range of each color channel. Optimizing the dynamic range of each color channel, through a non-monotonic reference signal behavior, can enhance the range of applications of future image sensors.

Those of ordinary skill in the art will recognize that the present invention has been described in terms of exemplary embodiments based upon use of a digital sampling, time integrating pixel sensor. However, the invention should not be so limited, since the present invention could be implemented using other pixel architectures.

Many other variations will also be evident to those of ordinary skill in the art. The embodiment disclosed can be embodied in a variety of systems including digital still and video cameras, optical recording systems and automotive imaging systems.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for color balancing an array of pixel sensors, each pixel sensor having a photo-detector for receiving light and producing a photo-voltage and a data buffer and each pixel sensor being responsive to light of one of a plurality of colors, said method comprising:

for each pixel sensor of the array of pixel sensors:
supplying a reference voltage signal of a plurality of reference voltage signals, at least one reference voltage signal for each of the plurality of colors, to the pixel sensor in accordance with the color of the light to which the sensor is responsive;
comparing the photo-voltage with the reference voltage signal in a comparator; and
storing a global counter value in the data buffer when the output of the comparator changes sign.

2. A method in accordance with claim 1, further comprising:

for each pixel sensor of the array of pixel sensors:
determining the optical power of light incident upon the pixel sensor; and
adjusting the reference voltage for one or more of the plurality of colors in accordance with the optical power of light incident on a plurality of pixel sensors of the array of pixel sensors.

3. A method in accordance with claim 2, wherein for each pixel sensor of the array of pixel sensors said determining comprises:

integrating the electrical output of the photo-detector to obtain a photo-voltage;
measuring an integration time as the time taken for said photo-voltage change from a first reference voltage level to a second voltage reference level; and
calculating the optical power of the pixel sensor from the integration time.

4. A method in accordance with claim 1, wherein the array of pixel sensors has a plurality of color channels corresponding to the plurality of colors and further comprising:

measuring the sensitivities of the plurality of color channels to light of one or more of the plurality of colors; and
adjusting the reference voltage for one or more channels of the plurality of color channels in accordance with the sensitivity of the channels.

5. A method for color balancing an array of pixel sensors, each pixel sensor having a photo-detector with an input for receiving light and an electrical output and each pixel sensor being responsive to light of one of a plurality of colors, said method comprising:

for each pixel sensor of the array of pixel sensors:
supplying a reference voltage signal of a plurality of reference voltage signals, at least one reference voltage signal for each of the plurality of colors, to the pixel sensor in accordance with the color of the light to which the sensor is responsive;

setting the sensitivity of the pixel sensor in accordance with the reference voltage signal;
determining the optical power of light incident upon the pixel sensor; and
adjusting the reference voltage for one or more of the plurality of colors in accordance with the optical power of light incident on a plurality of pixel sensors of the array of pixel sensors,
wherein for each pixel sensor of the array of pixel sensors said determining comprises:
integrating the electrical output of the photo-detector to obtain a photo-voltage;
measuring a first integration time as the time taken for said photo-voltage to reach a first reference voltage;
measuring a second integration time as the time taken for said photo-voltage to reach a second reference voltage; and
calculating the optical power of the pixel sensor from said first and second integration times.

6. A method for color balancing an array of pixel sensors, each pixel sensor having a photo-detector with an input for receiving light and an electrical output and each pixel sensor being responsive to light of one of a plurality of colors, said method comprising:
for each pixel sensor of the array of pixel sensors:
supplying a reference voltage signal of a plurality of reference voltage signals, at least one reference voltage signal for each of the plurality of colors, to the pixel sensor in accordance with the color of the light to which the sensor is responsive;
setting the sensitivity of the pixel sensor in accordance with the reference voltage signal;
determining the optical power of light incident upon the pixel sensor; and
adjusting the reference voltage for one or more of the plurality of colors in accordance with the optical power of light incident on a plurality of pixel sensors of the array of pixel sensors,
wherein at least one of the plurality of reference voltage signals is a ramp voltage signal and wherein for each pixel sensor of the array of pixel sensors said determining comprises:
integrating the electrical output of the photo-detector to obtain a photo-voltage;
sampling said photo-voltage at a first time to obtain a first sampled photo-voltage;
comparing said sampled first photo-voltage with said ramp voltage signal;
storing a first digital value into a first pixel data buffer when said first photo-voltage exceeds said ramp voltage signal;
sampling said photo-voltage at a second time to obtain a second sampled photo-voltage;
comparing said second sampled photo-voltage with said ramp voltage signal;
storing a second digital value into a second pixel data buffer when said second sampled photo-voltage exceeds said ramp voltage signal; and
calculating the optical power from said first and second digital values.

7. A method for color balancing an array of pixel sensors, each pixel sensor having a photo-detector with an input for receiving light and an electrical output and each pixel sensor being responsive to light of one of a plurality of colors, said method comprising:
for each pixel sensor of the array of pixel sensors:
supplying a reference voltage signal of a plurality of reference voltage signals, at least one reference voltage signal for each of the plurality of colors, to the pixel sensor in accordance with the color of the light to which the sensor is responsive;
setting the sensitivity of the pixel sensor in accordance with the reference voltage signal;
determining the optical power of light incident upon the pixel sensor;
adjusting the reference voltage for one or more of the plurality of colors in accordance with the optical power of light incident on a plurality of pixel sensors of the array of pixel sensors;
and further comprising:
for each pixel sensor of the array of pixel sensors, interpolating the optical power from a plurality of neighboring pixel sensors to obtain a plurality of color values for the pixel sensor; and
determining a reference pixel sensor for which the plurality of color values most closely represent white light,
wherein said adjusting causes the plurality of color values for the reference pixel sensor to more closely represent white light.

8. A method for color balancing an array of pixel sensors, each pixel sensor having a photo-detector with an input for receiving light and an electrical output and each pixel sensor being responsive to light of one of a plurality of colors, said method comprising:
for each pixel sensor of the array of pixel sensors:
supplying a reference voltage signal of a plurality of reference voltage signals, at least one reference voltage signal for each of the plurality of colors, to the pixel sensor in accordance with the color of the light to which the sensor is responsive;
setting the sensitivity of the pixel sensor in accordance with the reference voltage signal;
determining the optical power of light incident upon the pixel sensor;
adjusting the reference voltage for one or more of the plurality of colors in accordance with the optical power of light incident on a plurality of pixel sensors of the array of pixel sensors,
and further comprising:
for each pixel sensor in the array of pixel sensors, interpolating the optical power from a plurality of neighboring pixel sensors to obtain a plurality of color values for the pixel sensor; and
determining one or more reference pixel sensors for which a sum of the color values is greatest; and
determining an average optical power in each color channel for the plurality of pixel sensors neighboring the one or more reference pixel sensors,
wherein said adjusting causes the average optical power in each color channel for the plurality of pixel sensors neighboring the one or more reference pixel sensors to be substantially equal.

9. A method for color balancing an array of pixel sensors, each pixel sensor having a photo-detector with an input for receiving light and an electrical output and each pixel sensor being responsive to light of one of a plurality of colors and the array of pixel sensors including white pixel sensors, said method comprising:
for each pixel sensor of the array of pixel sensors:
supplying a reference voltage signal of a plurality of reference voltage signals, at least one reference voltage signal for each of the plurality of colors, to the pixel sensor in accordance with the color of the light to which the sensor is responsive;

setting the sensitivity of the pixel sensor in accordance with the reference voltage signal;
determining the optical power of light incident upon the pixel sensor; and
adjusting the reference voltage for one or more of the plurality of colors in accordance with the optical power of light incident on a plurality of pixel sensors of the array of pixel sensors,
and further comprising:
determining one or more reference white pixel sensors for which the optical power of light incident upon the white pixel sensor is greatest; and
determining the average optical power in each color channel for a plurality of pixel sensors neighboring the one or more reference white pixel sensors,
wherein said adjusting causes the average optical power in each color channel for the plurality of pixel sensors neighboring the one or more reference white pixel sensors to be substantially equal.

10. A pixel image sensor, comprising:
a plurality of reference voltage signal supply means, one for each of a plurality of colors;
an array of pixel elements arranged in a color mosaic pattern, each pixel element being responsive to light of one of the plurality of colors and each pixel element comprising:
an input for receiving a reference voltage signal corresponding to the color of light to which the pixel element is responsive;
a photo-detector having a sensitivity determined by the reference voltage signal; and
an output for providing a signal indicative of the power of the light incident upon the photo-detector,
a capacitive element electrically coupled to the photo-detector;
a comparator having a first input for receiving the reference voltage signal, a second input electrically coupled to the capacitive element, and an output; and
a pixel data buffer responsive to the comparator output and operable to store a global counter value.

11. A pixel image sensor in accordance with claim 10, wherein at least one of the plurality of reference voltage signal supply means is a digital to analog converter.

12. A pixel image sensor in accordance with claim 10, further comprising:
a sequence generator, coupled to said pixel data buffer and operable to supply a global counter value thereto.

13. A pixel image sensor in accordance with claim 10, further comprising:
a processor, operable to receive global counter values from a plurality of pixel data buffers and to derive therefrom the power of the light incident upon the corresponding pixel element.

14. A pixel image sensor in accordance with claim 13, wherein said processor is operable to adjust the plurality of reference voltage signals dependent upon the power of the light incident upon the array of pixel elements.

15. A pixel image sensor in accordance with claim 10, further comprising:
a lookup table operable to receive global counter values from a plurality of pixel data buffers and to derive therefrom digital power values indicative of the power of the light incident upon the corresponding pixel element; and
an image processor, operable to receive the digital power values and to adjust the plurality of reference voltage signals dependent upon the digital power values.

16. A pixel image sensor in accordance with claim 15, wherein said image processor is operable to adjust the plurality of reference voltage signals accordance with a color constancy algorithm.

17. A pixel image sensor in accordance with claim 15, wherein said image processor is operable to adjust the plurality of reference voltage signals in accordance with a color channel balance algorithm.

18. A pixel image sensor in accordance with claim 10, wherein the color mosaic pattern comprises an RGGB Bayer pattern.

19. A pixel image sensor in accordance with claim 10, wherein the reference voltage signals are determined by the relative sensitivities of the array to light of the plurality of colors.

20. A pixel image sensor, comprising:
a plurality of reference voltage signal supply means, one for each of a plurality of colors;
an array of pixel elements arranged in a color mosaic pattern, each pixel element being responsive to light of one of the plurality of colors and each pixel element comprising:
an input for receiving a reference voltage signal corresponding to the color of light to which the pixel element is responsive;
a photo-detector having a sensitivity determined by the reference voltage signal; and
an output for providing a signal indicative of the power of the light incident upon the photo-detector,
wherein the color mosaic pattern comprises the colors red, green, blue and white.

21. A pixel image sensor in accordance with claim 20, wherein the white balance of the array is determined from the power of light incident upon the white pixel elements in the array.

22. A pixel image sensor, comprising:
a plurality of reference voltage signal supply means, one for each of a plurality of colors;
an array of pixel elements arranged in a color mosaic pattern, each pixel element being responsive to light of one of the plurality of colors and each pixel element comprising:
an input for receiving a reference voltage signal corresponding to the color of light to which the pixel element is responsive;
a photo-detector having a sensitivity determined by the reference voltage signal; and
an output for providing a signal indicative of the power of the light incident upon the photo-detector,
wherein at least one of the plurality of voltage reference signals is a ramp voltage signal and wherein each pixel element further comprises:
a capacitive element electrically coupled to the photo-detector;
a sample and hold element having an input electrically coupled to the capacitive element and an output, said sample and hold element operable to respond to a trigger signal;
a comparator element having a first input for receiving the ramp voltage signal, a second input electrically coupled to the output of the sample and hold element and an output;
a first pixel data buffer responsive to the comparator output and operable to store a first counter value of a global counter when said ramp voltage signal is first exceeded; and a second pixel data buffer responsive to the comparator output and operable to store a second counter value of the global counter when said ramp voltage signal is next exceeded.

23. A pixel image sensor in accordance with claim 22, further comprising a digital to analog converter operable to supply said ramp voltage signal.

* * * * *